US012617226B1

(12) United States Patent
Murphy et al.

(10) Patent No.: US 12,617,226 B1
(45) Date of Patent: May 5, 2026

(54) ROBOTIC ENVELOPE SEPARATOR

(71) Applicant: Cenveo Worldwide Limited, Stamford, CT (US)

(72) Inventors: David Murphy, Springfield, MA (US); Juan Lugo, Springfield, MA (US); Tom McCullough, New Ipswich, NH (US); Eric Beaulieu, Chicopee, MA (US)

(73) Assignee: CENVEO WORLDWIDE LIMITED, Stamford, CT (US)

( * ) Notice: Subject to any disclaimer, the term of this patent is extended or adjusted under 35 U.S.C. 154(b) by 100 days.

(21) Appl. No.: 17/956,265

(22) Filed: Sep. 29, 2022

(51) Int. Cl.
　B65B 25/14 　　(2006.01)
　B25J 15/10 　　(2006.01)
　B43M 3/04 　　(2006.01)

(52) U.S. Cl.
　CPC .............. B43M 3/045 (2013.01); B25J 15/10 (2013.01); B65B 25/14 (2013.01); B65H 2701/1916 (2013.01)

(58) Field of Classification Search
　CPC ....................... B65H 2701/1916; B65H 31/06; B65H 29/40; B65B 13/20; B65B 25/14; B65B 25/141
　See application file for complete search history.

(56) References Cited

U.S. PATENT DOCUMENTS 4,879,862 A * 11/1989 Nolte .................... B65B 25/141
　　　　　　　　　　　　　　　　53/247
4,884,675 A * 12/1989 Muraro .................. B65H 29/40
　　　　　　　　　　　　　　　　198/379

4,949,835 A * 8/1990 Beeman ................ B65B 25/141
　　　　　　　　　　　　　　　　271/262
5,088,720 A * 2/1992 Beeman .................. B65H 33/02
　　　　　　　　　　　　　　　　271/189
5,425,565 A * 6/1995 Rogovein .......... B65H 31/3072
　　　　　　　　　　　　　　　　414/790.2
7,637,711 B2 * 12/2009 Wronski ................ B65H 31/06
　　　　　　　　　　　　　　　　414/793
7,789,226 B2 * 9/2010 Carrigan ................ B65D 71/02
　　　　　　　　　　　　　　　　206/451
2003/0120387 A1 * 6/2003 Sherwin .............. B25J 15/0052
　　　　　　　　　　　　　　　　294/2
2005/0157367 A1 7/2005 Miyazawa
2006/0157367 A1 * 7/2006 Carrigan ................ B65B 35/36
　　　　　　　　　　　　　　　　53/475
2013/0055689 A1 * 3/2013 Hoepner .................. B65B 5/00
　　　　　　　　　　　　　　　　53/381.1

OTHER PUBLICATIONS

International Search Report and Written Opinion; International Application No. PCT/US2023/033247; Feb. 8, 2024.

* cited by examiner

*Primary Examiner* — Andrew M Tecco
(74) *Attorney, Agent, or Firm* — Farber LLC

(57) ABSTRACT

An envelope separator is provided with a robotic arm and a support table where the robotic arm can fit fingers between envelopes to collect groups of envelopes from an envelope feeder and then separate those groups and allow for easy packaging of the envelopes into boxes. Preferably, the robotic arm accomplishes the packaging process as well by placing the groups of envelopes into boxes and continuing to gather and place successive groups of envelopes in successive boxes.

18 Claims, 12 Drawing Sheets

ROBOTIC ENVELOPE SEPARATOR

FIELD OF THE INVENTION

The following relates to paper products handling equipment and more particularly a robotic system for separating and packaging envelopes.

BACKGROUND OF THE INVENTION

Collecting and packaging envelopes is often a manual process where machines will fold and glue envelopes into various sizes and then feed them out into stacks for packaging. The packaging process involves a worker collecting a group of envelopes and moving them into a box or other package, closing the box and moving onto the next stack. Envelope manufacturing speeds have significantly increased over the years and although operators are typically able to keep up with the speed, there can be a risk of injury. Automated systems are also generally more efficient and cost effective and therefore gathering and manipulation of envelopes in an automated and efficient manner can increase throughput, quality and save cost.

SUMMARY OF THE INVENTION

It is an object of the invention to provide a simple robotic solution for collecting and packaging envelopes or other paper products fed from various manufacturing machines.

It is further desirable to provide a robotic solution for efficiently collecting envelopes/paper products to increase throughput and reliability.

These and other objects are achieved by providing a combination of a robotic arm and a support table where the robotic arm can fit between groups of envelopes supported on the support table to collect groups of envelopes and then separate those groups and place them in packaging.

In one aspect, an envelope separator is provided with an envelope feeder, a support and a first support. The support is adjacent the envelope feeder which is arranged to support envelopes received from said envelope feeder moving in a feed direction. The first support is moveable with respect to said support and at least two fingers comprising a first and a second finger connected to said first support and extending from either side of the first support, the first support configured to place the first and second fingers in position such that a plurality of the envelopes are between said first and second fingers. At least one of the first and second fingers is a moveable finger moveable with respect to the first support.

In certain aspects the envelope feeder comprises a wheel having an outer diameter and a rotation axis and defining a cylindrical feed area the wheel comprises a plurality of curved slots of equal length measured therealong, each curved slot arranged to curve away from a rotation direction of the wheel. In other aspects the first support is moveable by a robotic mechanism to tilt the first support such that the first finger is positioned between two envelopes and the second finger remains free from contact with envelopes fed from the envelope feeder and the robotic mechanism configured to then move the second finger into position behind a group of envelopes and the moveable finger configured to move to hold the group of envelopes between the first and second fingers. In still other aspects the support comprises a moveable support and a surface, the moveable support configured to move relative to the surface away from the envelope feeder as envelopes are positioned on the surface such that the moveable support holds envelopes upright on the surface, and the moveable support is biased towards the envelope feeder with a spring. In yet other aspects the support further comprises at least one support finger which is moveable, and wherein the support finger is configured to press against one or more of the plurality of envelopes and when a group of the plurality of envelopes are held between the first and second fingers and removed from the support, the support finger is configured to press against a first envelope in a next group of the plurality of envelopes to hold the first envelope in an upright position at least until the moveable support moves towards the envelope feeder to hold the first envelope in the upright position. In still other aspects the support defines two spaced sections with a gap therebetween, the two spaced sections configured to support envelopes received from the envelope feeder. The first support is configured to align within the gap between the two spaced sections with at least one of the first and second fingers extending a distance transverse to the two spaced sections. The first support and the two spaced sections are aligned in a plane wherein the two spaced sections each include a flat area and an angled area, the angled area aligned at least partially within the cylindrical feed area and the flat area positioned at least partially outside the cylindrical feed area, an end of the angled area defining an end of each spaced section, the end positioned at a height measured relative to the rotation axis which is less than the length of the plurality of curved slots.

In other aspects the first and second fingers are each moveable with respect to the first support. In still other aspects the moveable finger is configured to rotate about a pivot and the envelope feeder is configured to rotate to feed the envelopes. The first support and moveable finger are configured to be aligned in the gap in an envelope receiving position, the moveable finger is configured to move to an envelope separating position at a rotation rate in degrees/second which is equal to or greater than a rotation rate of the envelope feeder in degrees/second. At higher speeds, finger can move at a rotation rate less than that of the envelope feeder.

In other aspects at least one support finger is mounted to the support and configured to press against envelopes received from the envelope feeder to maintain an upright orientation of the envelopes supported by the two spaced sections. In yet other aspects the first finger comprises two spaced extensions which are arranged to press against a face of the envelope adjacent to vertical edges of the envelope where the envelope includes more material as compared to other portions of the envelope. In still other aspects at least one of the two spaced sections comprises two spaced tips and at least part of the envelope feeder is positioned between the two spaced tips.

In another aspect of the invention a method of separating groups of envelopes for packaging is provided including the steps of: providing an envelope feeder which feeds a plurality of envelopes to a support; positioning a robotic arm to move a finger between first and second envelopes fed from the envelope feeder, the finger attached to a first support; moving the first support away from the support with the robotic arm such that a group of envelopes from the plurality of envelopes between an initial envelope and the first envelope are separated from a next group of envelopes which begin with the second envelope; placing the group of envelopes in packaging; and repeating the positioning, moving and placing steps for each next group of envelopes such that the second envelope of a previous group of envelopes is the initial envelope of the next group of envelopes.

In certain aspects the positioning step includes tilting the first support and placing the finger between the first and second envelopes, moving the first support away from the envelope feeder, tilting the first support so that the group of envelopes are between the finger and a second fingers attached to the first support and pressing the group of envelopes with the finger and second finger to hold the group envelopes between the finger and second finger.

In some aspects the support includes two spaced portions and the positioning step positions the robotic arm between the two spaced portions. In other aspects the envelope feeder includes a plurality of wheels with channels therein the channels are each a curved slot of equal length measured therealong, each curved slot arranged to curve away from a rotation direction of the wheel. In other aspects the first support comprises a second finger and the method further comprises, after the positioning step and before the moving step, pressing the group of envelopes together between the finger and the second finger. In some aspects the two spaced portions each include two spaced tips and at least one of the wheels rotates between the two spaced tips of each of the two spaced portions.

In other aspects at least one support finger is configured to press against envelopes received from the envelope feeder to maintain an upright orientation of the envelopes in the next group of envelopes during the moving step.

In other aspects the support comprises a moveable support and a surface, the moveable support moving relative to the surface away from the envelope feeder as envelopes are fed on the surface and back towards the envelope feeder once envelopes are removed such that the moveable support holds envelopes upright on the surface. In still other aspects the finger moves during the moving step in a manner coordinated with the envelope feeder to place the finger between the first and second envelopes while one or both of the first and second envelopes are moving.

In yet another aspects of the invention an envelope separator configured to collect envelopes from an envelope feeder is provided. A support is adjacent the envelope feeder and including a surface and a moveable support the surface configured to support envelopes received from the envelope feeder moving in a feed direction and the moveable support configured to hold the envelopes upright and to move away from the envelope feeder as envelopes are fed onto the surface. A first support is moveable with respect to said support and at least two fingers comprising a first and a second finger connected to said first support and extending from either side of the first support, the first support configured to align with the first finger between two envelopes with a group of envelopes between the first and second fingers. At least one of the first and second fingers is a moveable finger moveable with respect to the first support.

In certain aspects the moveable finger is positioned closer to the envelope feeder than the first finger, the support comprising two spaced sections each having an inclined section and the moveable finger is moveable from a position aligned with the inclined sections to a position extending across the feed direction to separate a plurality of envelopes from other envelopes being fed out of the envelope feeder. In other aspects wherein the envelope feeder is configured to rotate to feed the envelopes; and the first support is attached to a robotic arm. In still other aspects the robotic arm is configured to tilt the first support to place the first finger between the two envelopes and move the first support such that the second finger is positioned at an opposite side of the group of envelopes and the moveable finger is configured to move to exert pressure on the group of envelopes to hold the group of envelopes. In yet other aspects an end of the finger is configured to move away from the envelope feeder.

In one aspect an envelope separator is provided with an envelope feeder and a support adjacent the envelope feeder. The support defines two spaced sections with a gap therebetween, the two spaced sections are configured to support envelopes received from said envelope feeder moving in a feed direction. The support may be adjustable to accommodate different envelope sizes in separation, height and position, however, the support remains fixed once a particular envelope size is decided upon. A first support is moveable with respect to said support and at least two fingers, which include a first and a second finger, are connected to the first support and extend from either side of the first support. The first support is configured to align within the gap between the two spaced sections with at least one of the first and second fingers extending a distance transverse to the two spaced sections when the first support and the two spaced sections are aligned in a plane. At least one of the first and second fingers is a moveable finger that is moveable with respect to the first support.

In certain aspects the envelope feeder comprises a wheel having an outer diameter and a rotation axis, the wheel defining a cylindrical feed area. At least part of each spaced section is positioned within the cylindrical feed area between the outer diameter and the rotation axis and each spaced section extends outside the cylindrical feed area. In other aspects the wheel comprises a plurality of curved slots of equal length measured therealong, each curved slot arranged to curve away from a rotation direction of the wheel. In other aspects the two spaced sections each include a flat area and an angled area, the angled area aligned at least partially within the cylindrical feed area and the flat area positioned at least partially outside the cylindrical feed area, an end of the angled area defining an end of each spaced section, the end positioned at a height measured relative to the rotation axis which is less than the length of the plurality of curved slots.

In other aspects the second finger is the moveable finger and is positioned closer to the envelope feeder than the first finger. The two spaced sections each have an inclined section and the second finger is moveable from a position aligned with the inclined sections to a position extending across the feed direction to separate a plurality of envelopes from other envelopes being fed out of the envelope feeder. In other aspects the moveable finger is configured to rotate about a pivot and the envelope feeder is configured to rotate to feed the envelopes; and the first support and moveable finger are configured to be aligned in the gap in an envelope receiving position, the moveable finger is configured to move to an envelope separating position at a rotation rate in degrees/second which is less than a rotation rate of the envelope feeder in degrees/second.

In other aspects at least one finger is mounted to the support and is configured to press against envelopes received from the envelope feeder to maintain an upright orientation of the envelopes supported by the two spaced sections. In certain aspects an end of at least one finger is configured to move away from the envelope feeder. In yet other aspects at least one of the two spaced sections comprises two spaced tips and at least part of the envelope feeder is positioned between the two spaced tips.

Other objects are achieved by providing a method of separating groups of envelopes for packaging comprising one or more steps of providing an envelope feeder which feeds a plurality of envelopes to a support; positioning a robotic arm below the plurality of envelopes and moving a finger between first and second envelopes in the envelope feeder, the finger attached to a first support; moving the first support away from the support with the robotic arm such that a group of envelopes from the plurality of envelopes between an initial envelope and the first envelope are separated from a next group of envelopes which begin with the second envelope; placing the group of envelopes in packaging; repeating the positioning, moving and placing steps for each next group of envelopes such that the second envelope of a previous group of envelopes is the initial envelope of the next group of envelopes.

In certain aspects the support includes two spaced portions and the positioning step positions the robotic arm between the two spaced portions. In other aspects the envelope feeder includes a plurality of wheels with channels therein. In still other aspects the two spaced portions each include two spaced tips and at least one of the wheels rotates between the two spaced tips of each of the two spaced portions. In yet other aspects at least one finger is mounted to the support and configured to press against envelopes received from the envelope feeder to maintain an upright orientation of the envelopes supported by the two spaced sections.

In still other aspects the finger is configured to rotate about a pivot during the moving step and the envelope feeder is configured to rotate to feed the envelopes. When the support and finger are aligned in a gap between two spaced portions of the support and in an envelope receiving position, the finger is configured to move to an envelope separating position at a rotation rate in degrees/second which is less than a rotation rate of the envelope feeder in degrees/second.

Other objects of the invention and its particular features and advantages will become more apparent from consideration of the following drawings and accompanying detailed description.

DETAILED DESCRIPTION OF THE INVENTION

Figure 1:
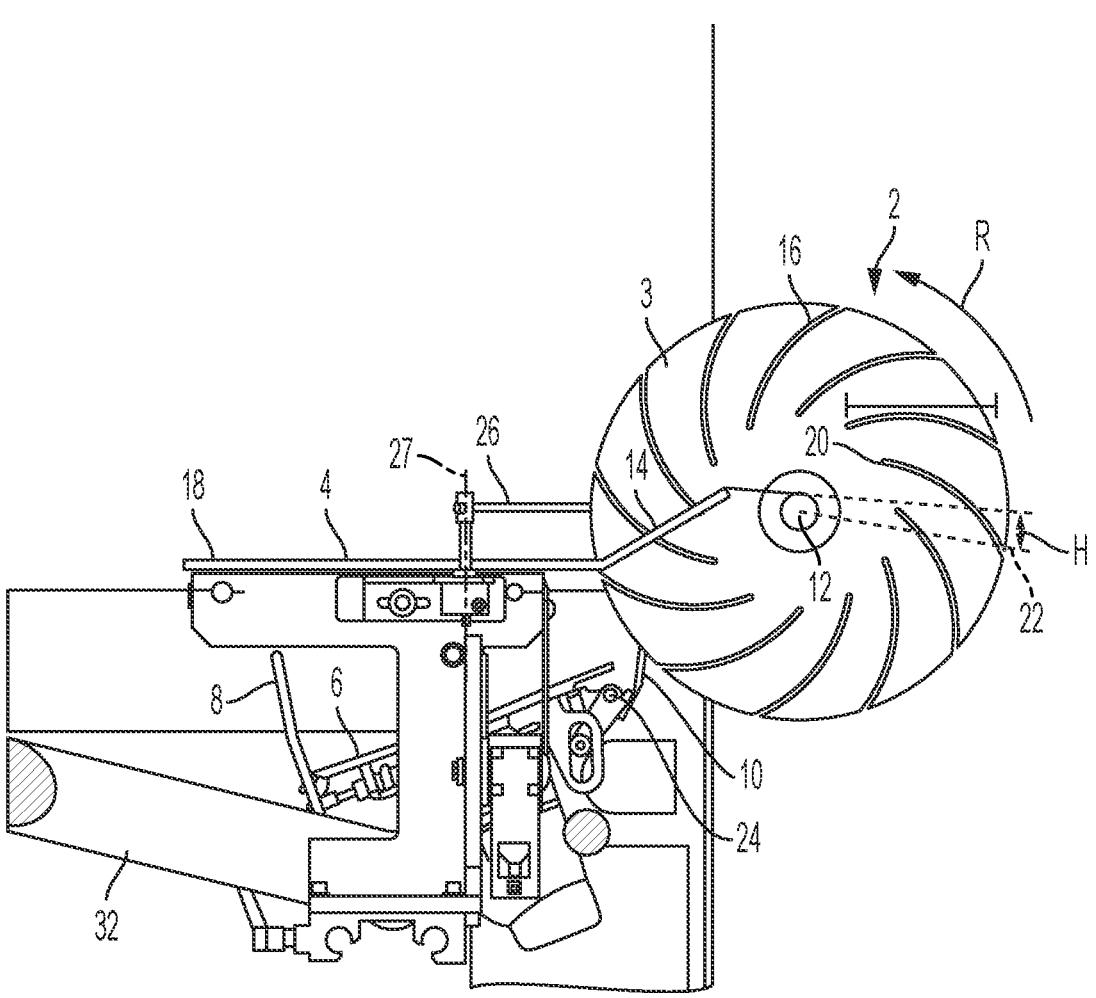
FIG. 1 is side cross section view of an envelope separator along line 1-1 in FIG. 3
Figure 2:
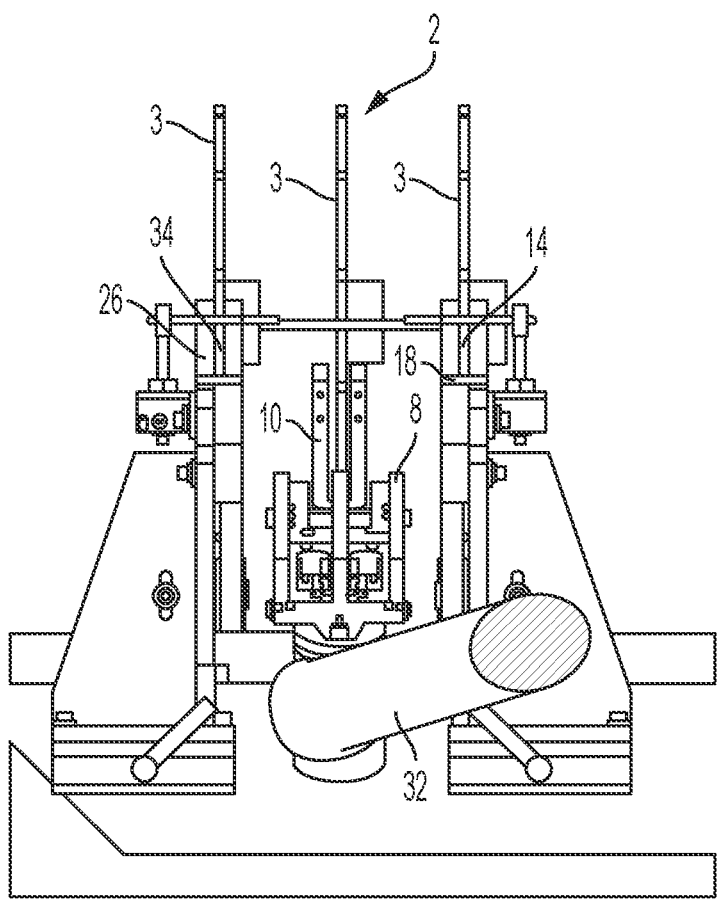
FIG. 2 is a rear view of the envelope separator of FIG. 1
Figure 3:
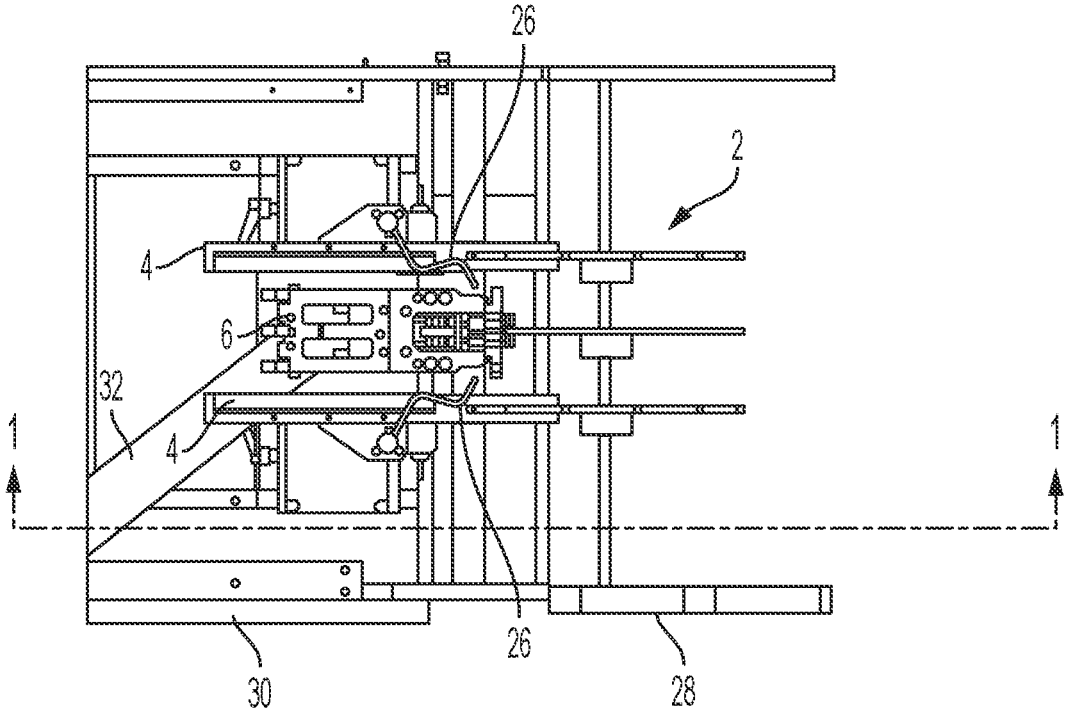
FIG. 3 is a top view of the envelope separator of FIG. 1
Figure 4:
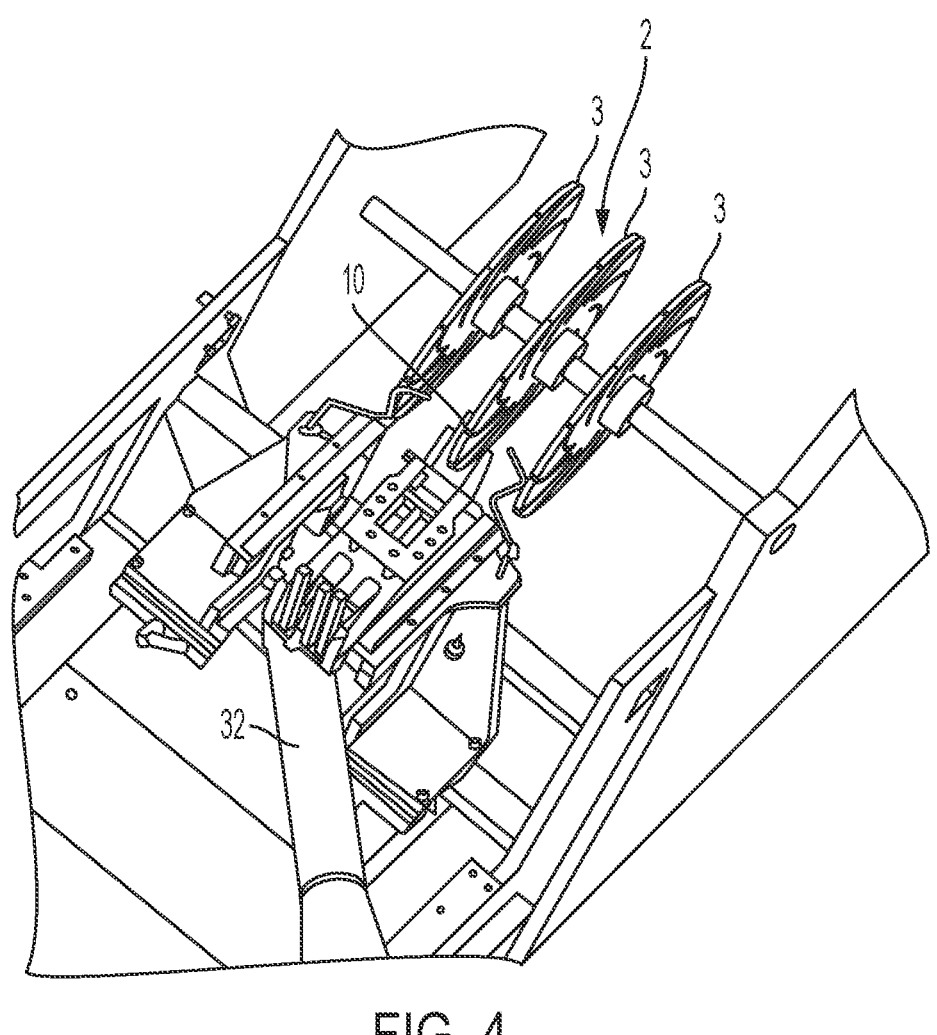
FIG. 4 is a perspective view of the envelope separator of FIG. 1.

Referring now to the drawings, wherein like reference numerals designate corresponding structure throughout the views. The following examples are presented to further illustrate and explain the present invention and should not be taken as limiting in any regard.

FIGS. 1-4 show the envelope separator including the envelope feeder 2 which includes three wheels 3 with a number of curved channels having a length L measured from base 20 to end 22. The area between the diameter at the base 20 and the diameter at the end 22 defines a feed area where envelopes which are within the channels 16 can be removed by the separator. The wheels 3 rotate about axis 12 at the shaft and rotate in the rotation direction R which from the view shown in FIG. 1 is counter clockwise. The channels as shown curve away from this rotation direction or generally from base 20 to end 22 in a clockwise direction as viewed in FIG. 1.

The envelope separator includes a support 4 with flat sections 18 and elevated 14 sections. The elevated 14 sections as shown provide an angle in the range of 5-45 degrees, more preferably 10-35 degrees. It is contemplated that the elevated section 14 could be curved and thus the angle would be measured from base to end of the curve despite the curve moving away from this measured angle line. Fingers 26 are provided on the support 4 and rotate about axis 27. These fingers 26 include a rotational spring or resistance that allows the fingers 26 to rotate backwards when envelopes are added to the table and forwards when envelopes are removed. The fingers can also be controlled to move forwards or backwards by air pressure actuators or electric actuators, for example in one embodiment an air spring is used. This rotation allows for additional envelopes to be added to the stack but maintains a generally upright or vertical orientation of those envelopes. The elevated section 14 is provided with a gap 34 (FIG. 2) and within this gap the two side wheels 3 rotate.

A robotic arm 32 is provided with a support 6 at its end. The support includes fingers 8 and 10, the front finger 10 is provided with two spaced portions through which the center wheel 3 can rotate. The front rotatable finger 10 rotates about pivot 24 which is controlled by the robotic arm 32 and its underlying software. The rear fingers 8 are shown as 3 spaced fingers extending from support 6 which extend generally perpendicular and/or slightly angled forward when the support 6 is level.

In operation, the feeder 3 will rotate with envelopes having been fed into the channels 16 by another machine. As the base of the channels 20 aligns with the elevated section 14, the envelope begins to be pushed out of the channel 16. Fingers 26 support the envelope as the wheel continues to rotate until the envelope is fully expelled from the channel once the end 22 is level with the support 4 (whether at the flat 18 or elevated 14 section). As the envelopes are fed in this manner the robotic arm 32 will have placed its support 6 level with the flat 18 section of support 4 or otherwise to orient the finger 10 for separation of envelopes and allow the finger 8 to be below the support 4. The front finger 10 is tilted forward to generally align with the elevated 14 section. Once a certain pre-set number of envelopes have been fed out of the wheel, the finger 10 will rotate backwards or towards finger 8 or rotate backwards by virtue of the arm 32 manipulating the finger. Eventually the finger 8 and finger 10 move together (at least one moves) to hold the envelopes between the two fingers 10/8 and the robotic arm will lift the stack of envelopes out from between the spaced supports 4. This motion may include both a horizontal and vertical component of motion of finger 10 as manipulated by the robotic arm and the fingers 10 and 8 can pivot to grab the envelopes. The next group of envelopes will continue to be supported by fingers 26 as the support 6 places the removed envelopes in packaging. The process then repeats with the robotic arm placing the arm support 6 below the support 4 as shown in FIG. 1 and then moving it upwards to collect envelopes and manipulating the finger 10 to align with elevated section 14.

Timing the movement of the finger 10 with the rotation of the wheels 3 is also important. Specifically, when the finger 10 is in aligned position with elevated section 14, the finger will need to be rotated backwards (towards finger 10) at a speed such that the finger moves into the space between two adjacent channels and does not interfere with envelope feeding or removal. Thus, the rotation rate R has to be timed with the rotation rate of the finger and the timing of initial movement of the finger 10 also has to be timed. Typically, the finger 10 will be shorter than section 14 in terms of its position relative to the axis 12 in aligned position and the timing will be coordinated such that the finger 10 does not push the envelopes out of the channels or such that the finger's contact with the envelope follows that of the intersection of the channel with the top plane(s) of the support 4. For example, FIG. 1 shows intersection of one channel closer to the end of section 14 with another intersection of an adjacent channel lower down on that section 14.

Figure 5:
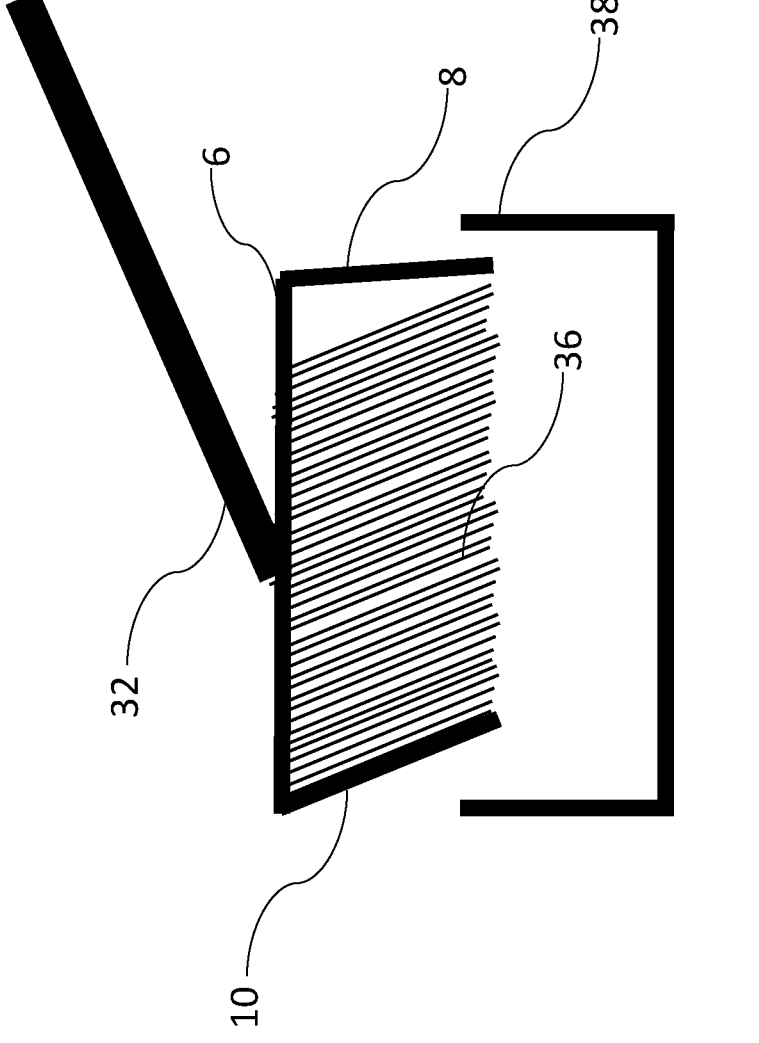
FIG. 5 is a schematic representation of the separator of FIG. 1 placing envelopes in a box.

Referring to FIG. 5, the envelope separator is shown having collected the envelopes 36 and rotated the finger 10 to hold the envelopes. The robotic arm 32 then rotates the support 6 upside down and moves the envelopes into the box 38 (preferably cardboard or paperboard). The finger 10 is then extended enough to allow the envelopes 36 to remain in the box as the support 6 is removed for collecting the next group of envelopes.

Referring to FIGS. 6-9 the process of collecting envelopes is shown with a top pick envelope separator. The features of the separator in the top configuration are in many ways similar or the same as the bottom pick separator, but some specific differences are discussed. The front finger 10 with the forked configuration is arranged to move forward and backwards and is maintained generally perpendicular to support 6 or possibly slightly angled towards the rear of the envelope stack. For example, in the 0-10 or 0-5 degree range. As can be seen in better detail in FIG. 10, the bottoms of each finger 86/106 have a more pronounced inwards angle, particularly about 5-20 degrees, as compared to the main sections 104/84 which have a more vertical angle of 0-10 degrees.

Figure 6:
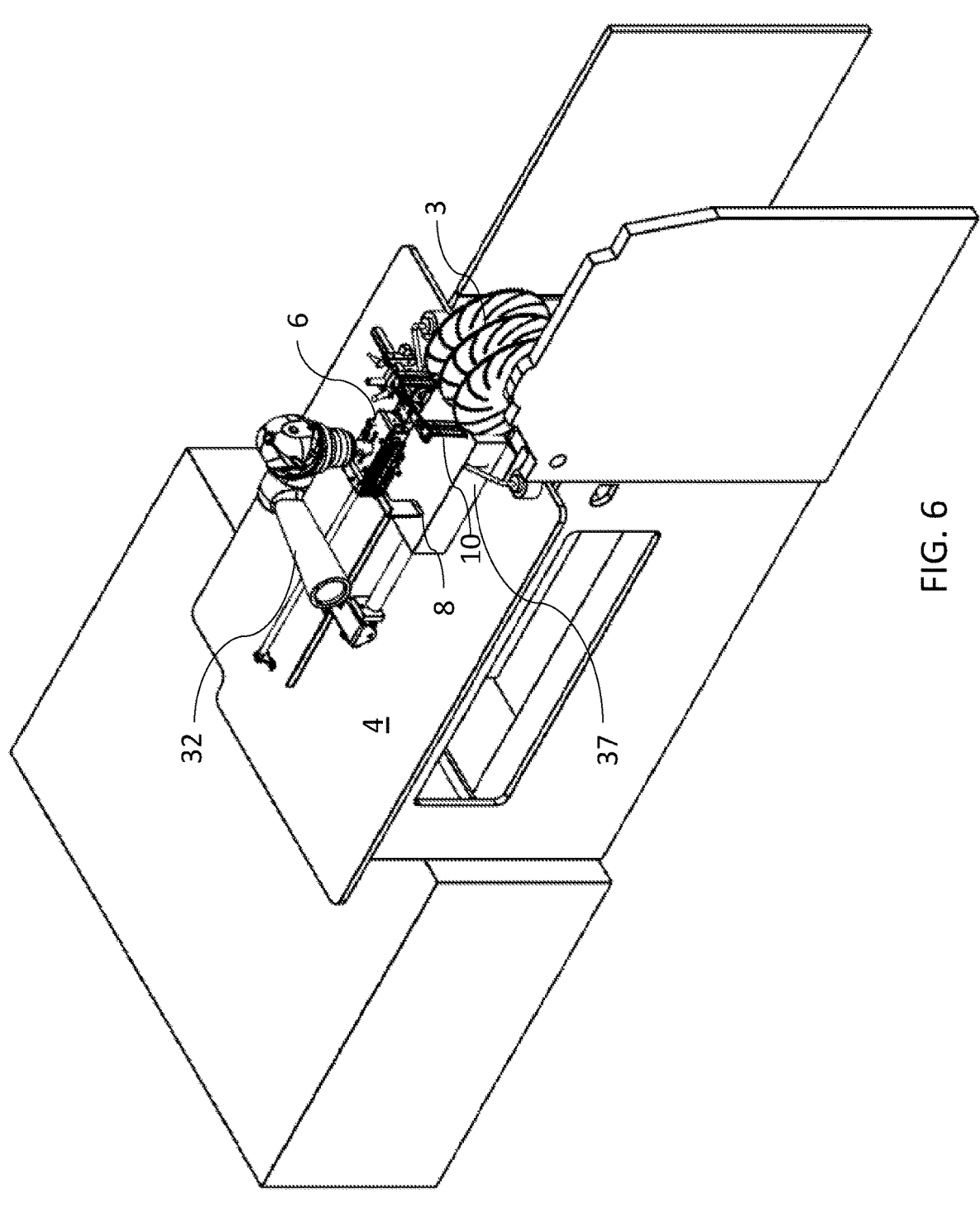
FIGS. 6-8 are each a perspective view of a top pick envelope separator.
Figure 7:
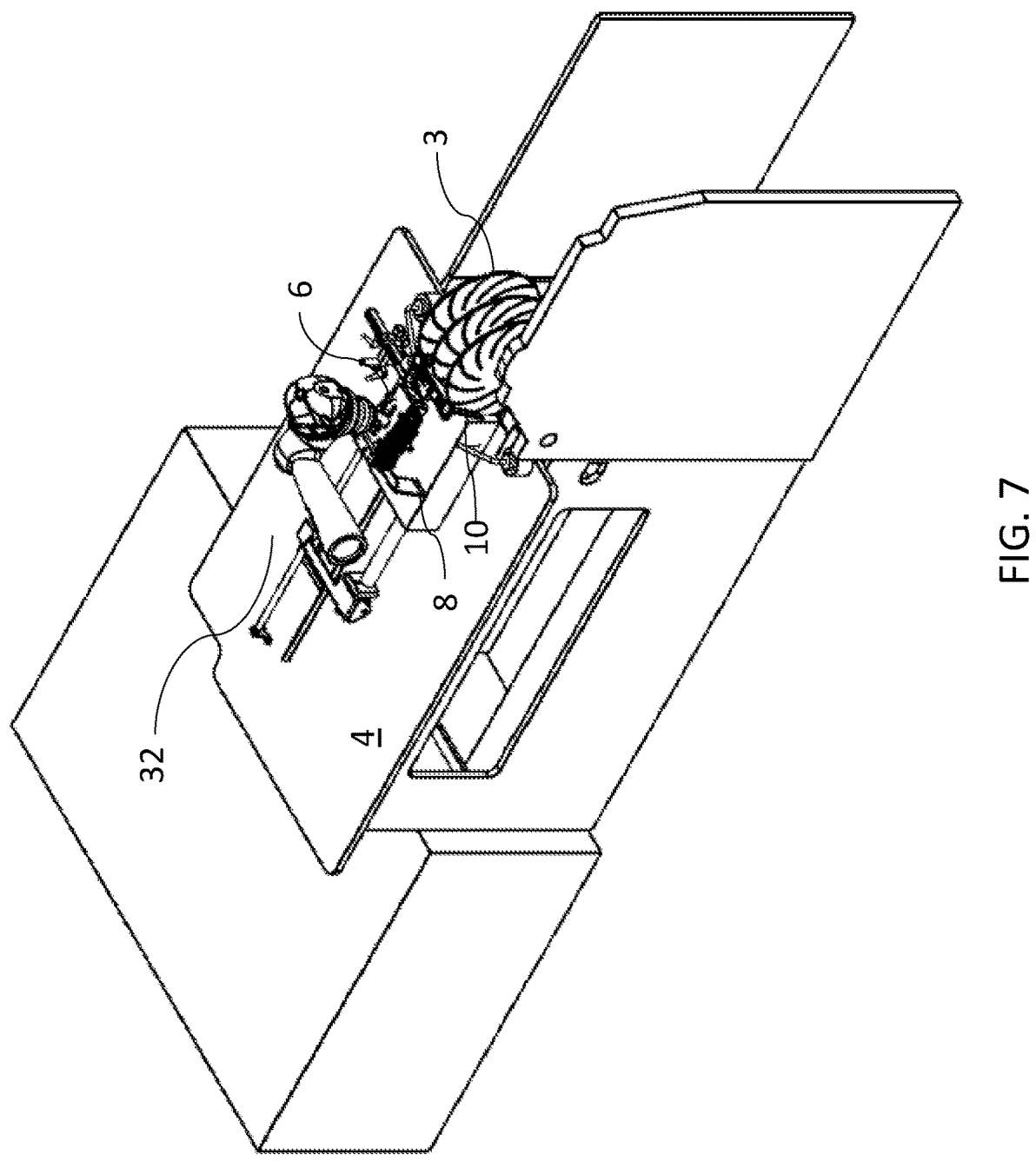
Figure 8:
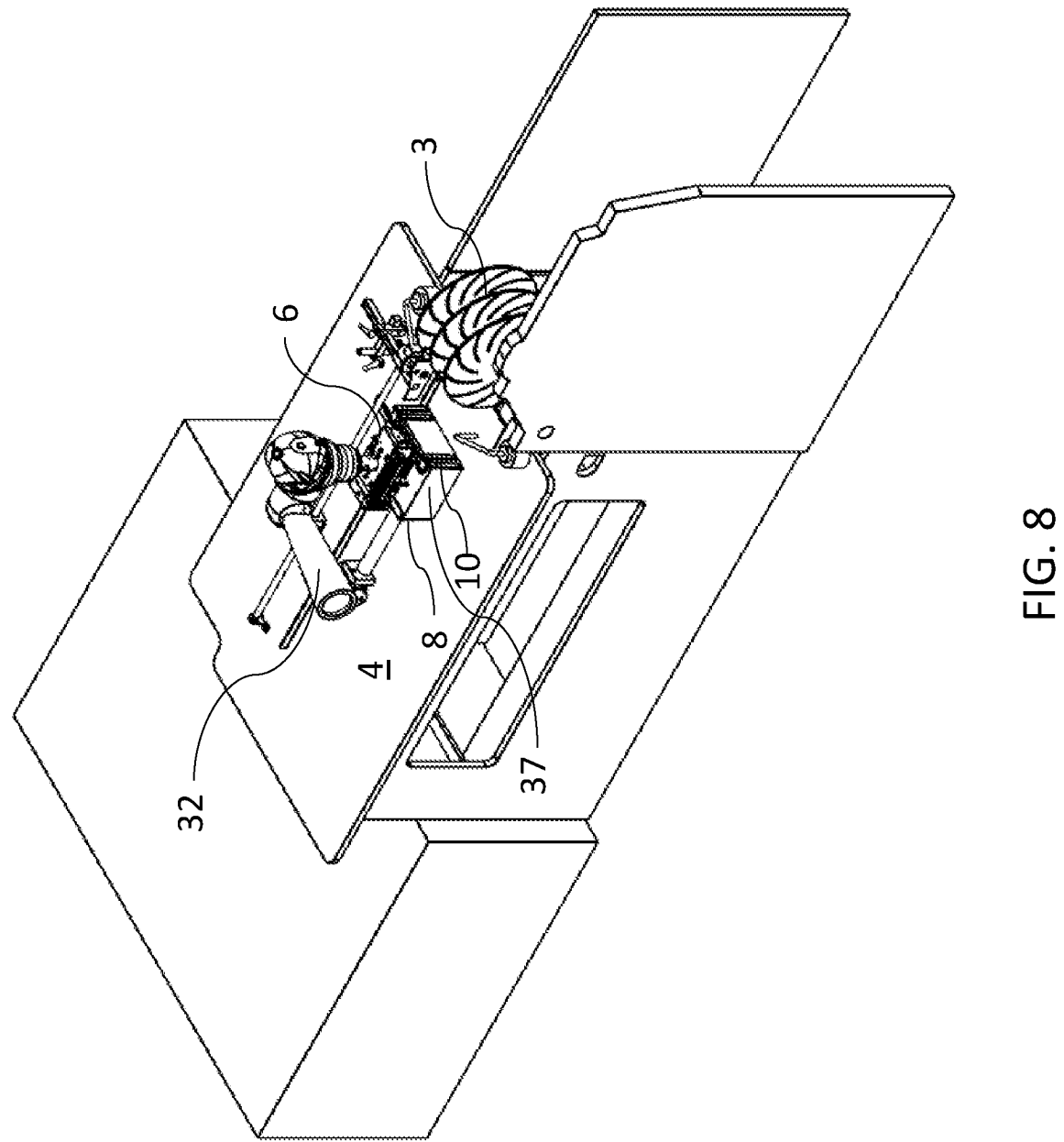
Figure 9:
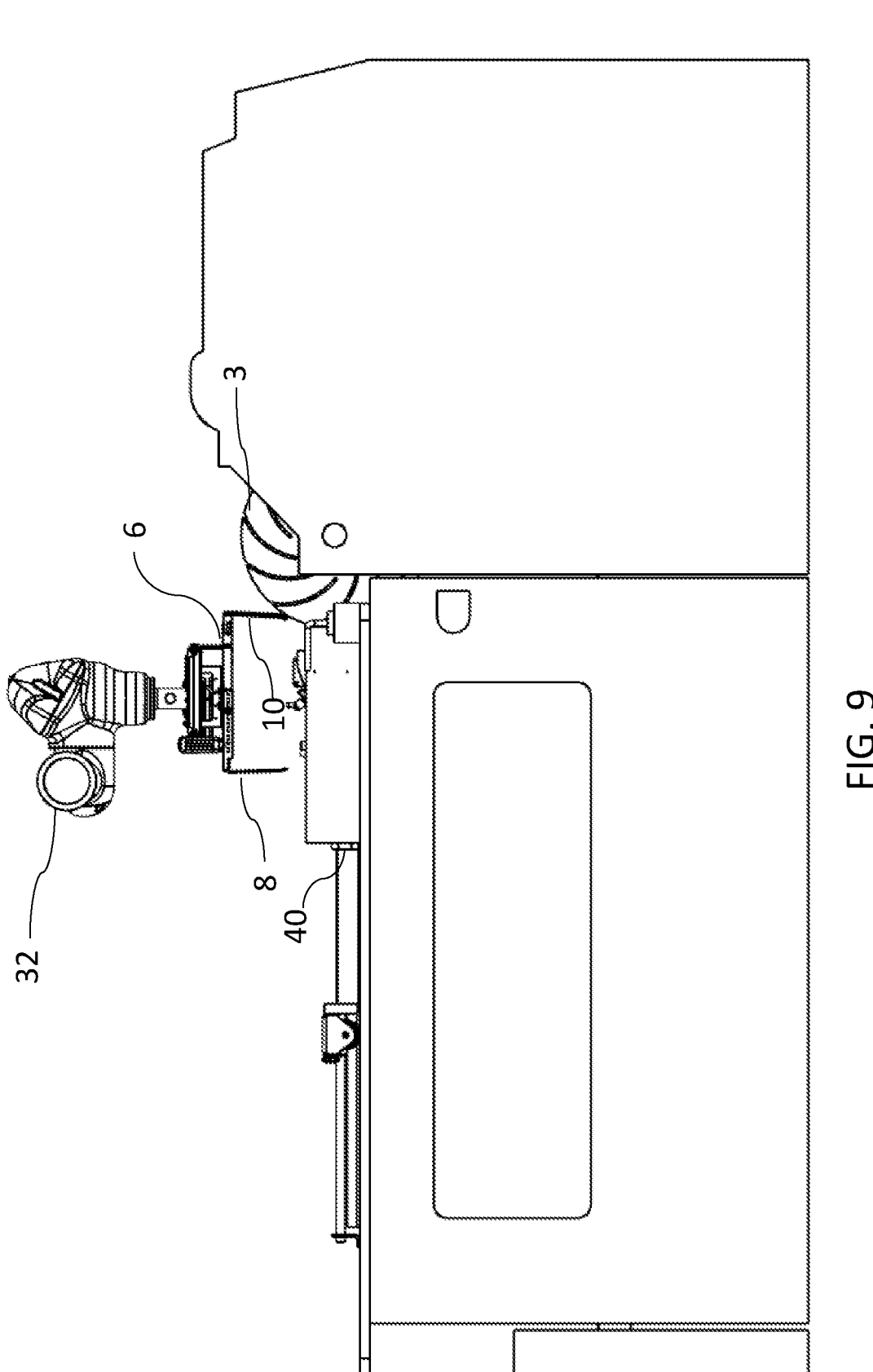
FIG. 9 is a side view of FIG. 6

The rear non-forked finger 8 may be stationary relative to support 6 or may also move, also generally perpendicular to support 6. As shown in FIG. 6 the front finger 10 is arranged to grab the front of the stack to be separated. Here, the forks of finger 10 are positioned on either side of the outer wheels of the feeder 3. As shown in FIG. 7, the robotic arm 32 tilts the support 6 downwards between two incoming envelopes. This causes the front finger 10 to be between the first envelope in the stack and the envelope of the next stack. The arm 32 then pulls backwards to compress the stack 37. As can be seen in comparing FIGS. 7 and 8, the stack 37 in FIG. 8 is much shorter due to compressing the stack 37. Once the rear finger 8 is behind the rearmost envelope, the arm 32 pivots the support 6 down to level with the table 4. As can be seen, finger 8 is maintained away from contact with the envelopes when the arm 32 pulls backwards to compress the stack 37 and then this finger 8 comes into contact with the envelopes once the support 6 is tilted down and the fingers moved together. As a result, finger 8 is now behind the rearmost envelope in the stack. The fingers are brought together to hold the envelopes in the stack. The envelopes can then be taken away and placed in the box 38.

Figure 10:
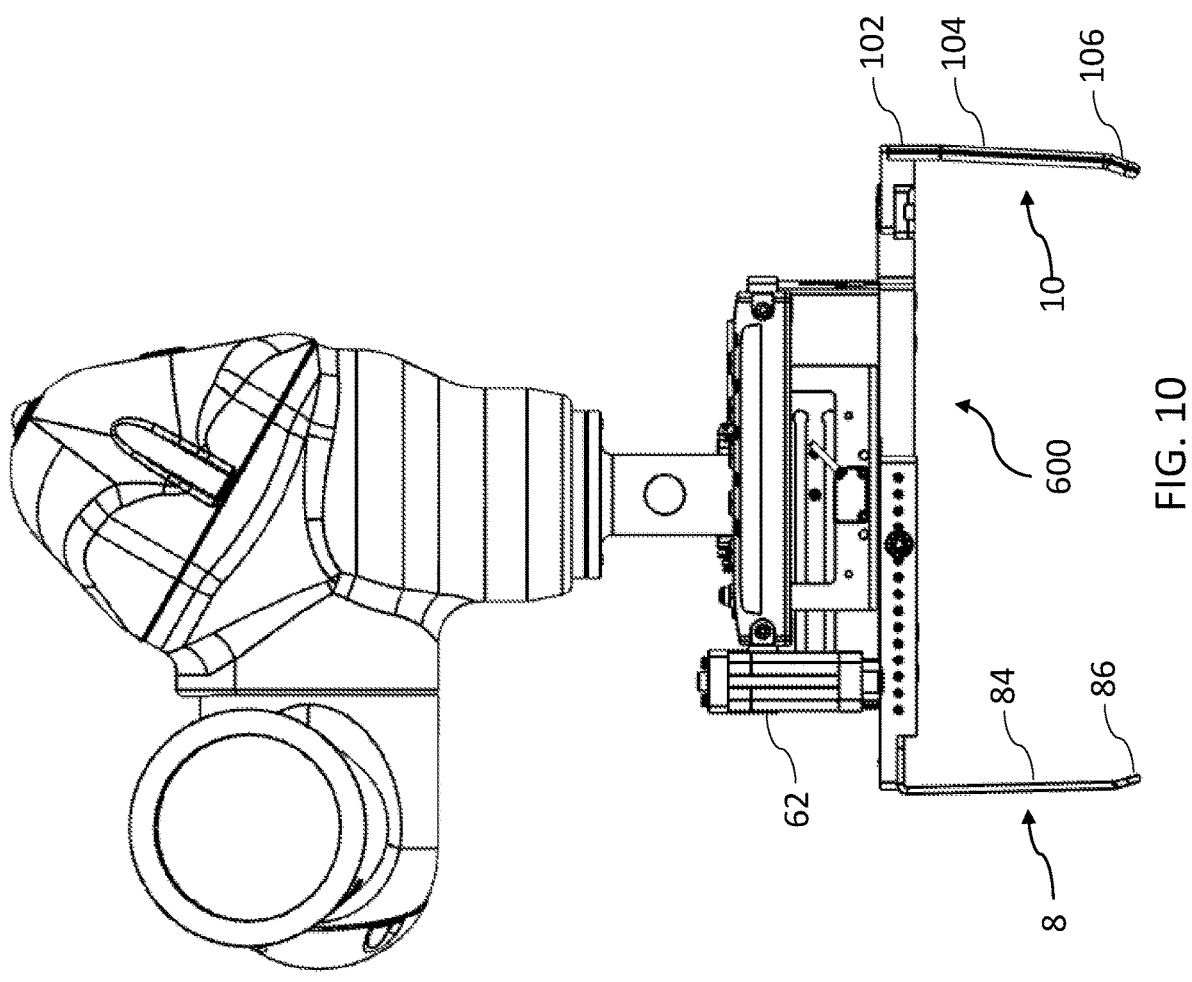
FIG. 10 is a side detail view of the robotic arm and envelope collector of FIGS. 6-9.

In general, the envelopes used include folds near the edges so that there are extra layers of paper at these locations. With the envelope flap also providing another layer of paper at the top corners, the result of the fold and the flap creates a localized area with e.g. four layers of paper. In comparison, the middle of the envelope might have e.g. 2 layers of paper and the area of the envelope with the flap will have 3 layers of paper. Thus, the envelope separator and specifically the fingers interact with this four layer section which will provide resistance to compression soonest as compared to the other sections of the envelope. In preferred embodiments, the envelopes are fed upside-down such that this four layered area is facing down and thus comes into contact with sections 86/106 of the fingers (FIG. 10). These more pronounced angles interacting with the thickest portion of the envelope along with the close proximity to the table 4 will cause the envelope stack to bow upwards slightly towards the upper area 600 of the support. This creates an arch like arrangement of the envelopes while held between the fingers 8/10. As a result, the envelopes are held securely between the fingers 8/10 when so desired and the arch shape inhibits envelopes from falling out of the stack and causing the whole stack to be dropped due to loss in pressure on the 4 layer area. Proper positioning and spacing of the fingers 8/10 is important to ensure proper operation of the separator and placement of the envelopes. Specifically, actuator 62 is preferably a pneumatic actuator which provides three positions. There are the typical open and closed positions for the gripper and then the pneumatic actuator can extend a stop pin to prevent the gripper from fully opening. This is useful when the envelopes are in the package but the gripper has not yet been removed. The partially open position allows the envelopes to separate from the gripper, but the gripper will not damage the packaging.

Figures 11, 12:
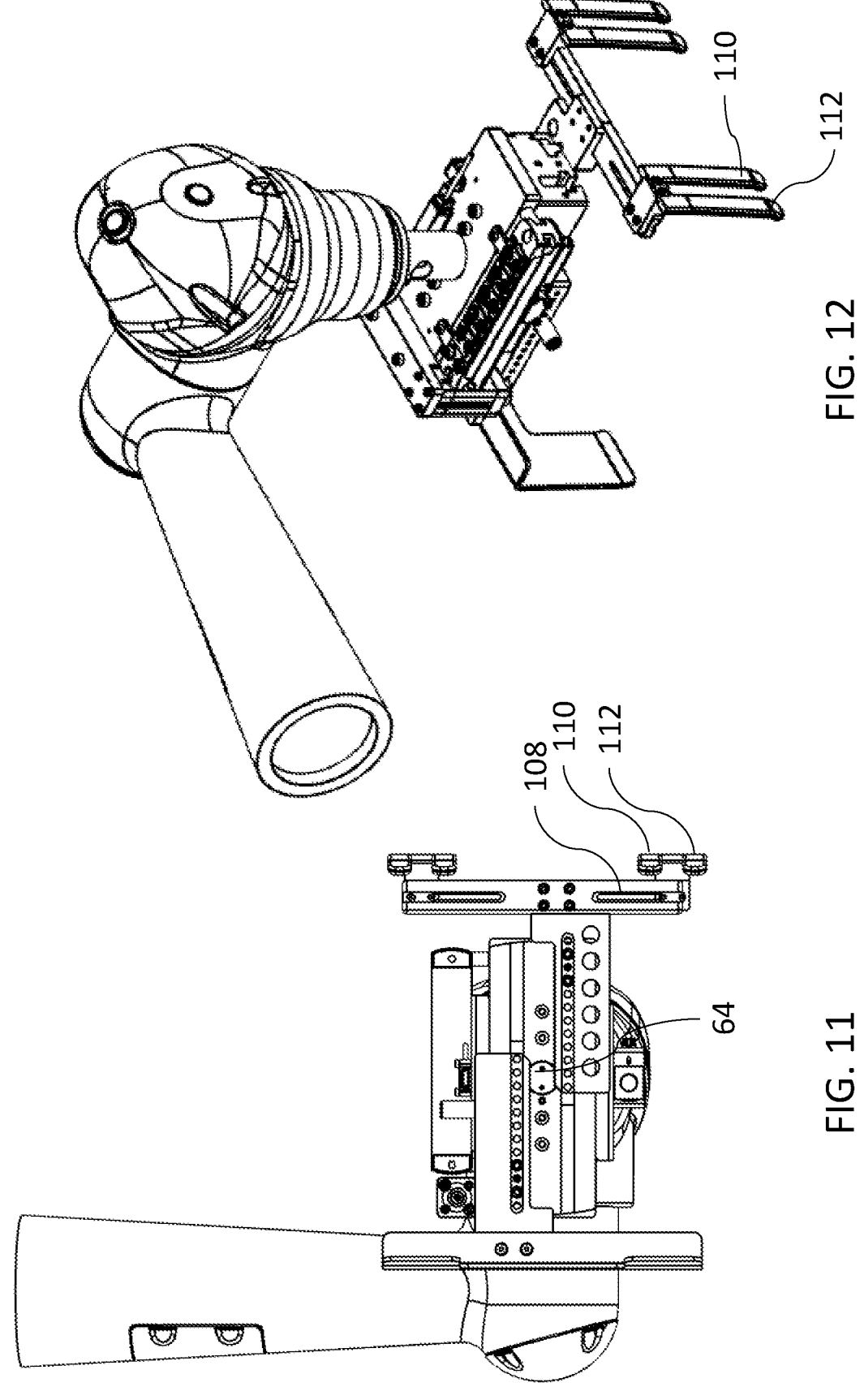
FIG. 11 is a bottom view of FIG. 10.
FIG. 12 is a perspective view of FIG. 10.

The robotic arm includes a motor therein which drives gear 64. Rotation of this gear causes the fingers 8/10 to move in/out relative to each other to grab/release the envelopes and to position the fingers 8/10 for appropriate separation before grabbing. Referring to FIGS. 11-12, Slot 108 is provided for the front fingers to allow for adjustment of the spacing for different size envelopes. The wheel 3 spacing would likewise be adjusted. Finger 10 includes a wider section as compared to finger 8 and this allows for use with a variety of different sized envelopes without requiring adjustment. Since the spacing of the wheel 3 can be adjusted for different envelope sizes, and since the forks 110, 112 are designed to go on either side of the outer wheels 3 when separating envelope groups, the front finger 8 requires in/out adjustment whereas the rear finger 10 can be wider to provide for less setup time when changing envelope sizes.

Figure 7A:
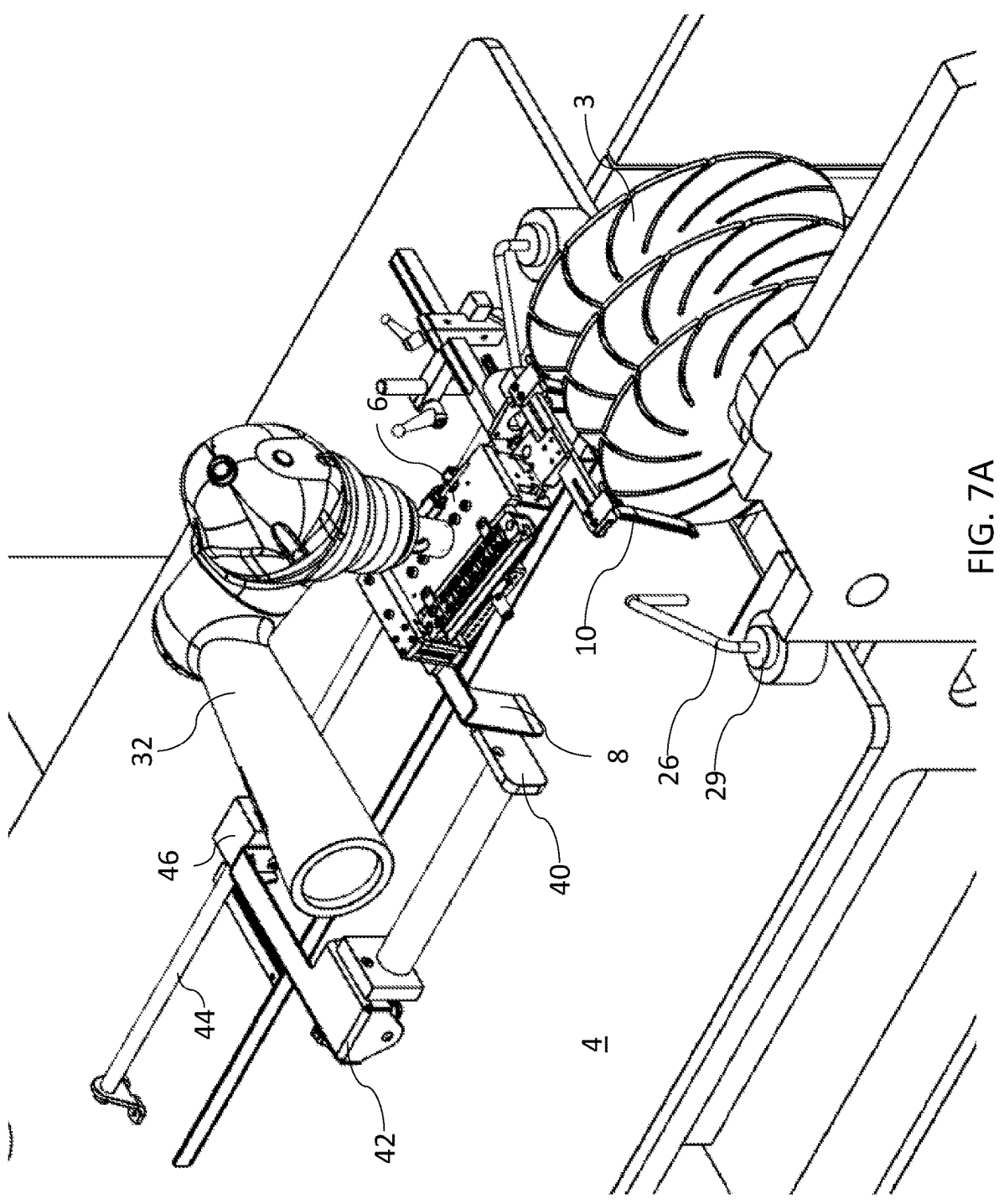
FIG. 7A is a perspective detail view of FIG. 7 with the envelope stack removed.

As shown in FIG. 7A, the envelope stack is removed. The rear support 40 will maintain the envelopes in the upright position. This support 40 includes moveable trolley 42 which may include a spring/follower mechanism 46/44. In this way, the support 40 will provide enough resistance to keep the envelopes stacked but will move backwards as more envelopes are fed onto the table 4 so as to not impede additional envelopes being placed on the support/table 4 as fed from the envelope feeder. Once the rear finger 8 is positioned (support 6 tilted level-FIG. 8) and the envelopes then lifted/removed from the table 4, the rear support 40 will be moved back to the front of the envelope stack. However, when the stack 37 is removed (i.e. arm 32 lifts up from FIG. 8 position), the first few envelopes need to be kept vertical to avoid them falling over and clogging the machine or requiring manual intervention to position the envelopes vertically. Thus, rotary fingers 26 will move around in a coordinated fashion with the front finger 10 to support the next envelope that belongs in the next stack to be gathered/ separated. These fingers 26 in preferred embodiments utilize an air spring/air rotary mechanism or electrical mechanism 29 to control positioning of the fingers 26. Then, the rear support 40 will move back into place to take over from the fingers 26 in supporting the envelopes. For example, as seen in FIG. 7, the fingers 26 have rotated away from the envelopes so that they are in contact with the sides of the envelopes. FIG. 8 shows the fingers 26 in process of moving around to support the incoming feed of envelopes. The speed at which the fingers 26 move to support the envelopes and the speed with which the finger 10 move backwards may be relatively quick and are also coordinated in that the finger 10 will initially support the incoming envelopes and as the finger 26 passes finger 10, the first envelope in the next group will be supported appropriately to maintain a generally vertical position.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An envelope separator comprising:
an envelope feeder including a plurality of curved channels each with a base and an end and the envelope feeder defining a cylindrical feed area between the base and the end of the channels;
a support adjacent the envelope feeder which is arranged to support envelopes received from said envelope feeder moving in a feed direction;
a first support moveable with respect to said support and at least two fingers comprising a first and a second finger connected to said first support and extending from either side of the first support, at least one of the at least two fingers configured to be moved into the cylindrical feed area and the first and second fingers further configured to be positioned such that a plurality of the envelopes are pressed between said first and second fingers with the first finger pressing against a first face of a first one of the plurality of envelopes and the second finger pressing against a second face of a second one of the plurality of envelopes;
at least one of the first and second fingers is a moveable finger moveable with respect to the first support.

2. The envelope separator of claim 1 further wherein the envelope feeder comprises a wheel having an outer diameter and a rotation axis and defining the cylindrical feed area the wheel comprises a plurality of curved slots of equal length measured therealong, each curved slot arranged to curve away from a rotation direction of the wheel.

3. The envelope separator of claim 2 further comprising:
the support defining two spaced sections with a gap therebetween, the two spaced sections configured to support envelopes received from said envelope feeder;
the first support configured to align within the gap between the two spaced sections with at least one of the first and second fingers extending a distance transverse to the two spaced sections when the first support and the two spaced sections are aligned in a plane wherein the two spaced sections each include a flat area and an angled area, the angled area aligned at least partially within the cylindrical feed area and the flat area positioned at least partially outside the cylindrical feed area, an end of the angled area defining an end of each spaced section, the end positioned at a height measured relative to the rotation axis which is less than the length of the plurality of curved slots.

4. The envelope separator of claim 1 wherein the first support is moveable by a robotic mechanism to tilt the first support such that the first finger is positioned between two envelopes and the second finger remains free from contact with envelopes fed from the envelope feeder and the robotic mechanism configured to then move the second finger into position behind a group of envelopes and the moveable finger configured to move to hold the group of envelopes between the first and second fingers.

5. The envelope separator of claim 1 wherein the first and second fingers are each moveable with respect to the first support.

6. The envelope separator of claim 1 wherein the moveable finger is configured to rotate about a pivot;
the support defining two spaced sections with a gap therebetween;
wherein the envelope feeder is configured to rotate to feed the envelopes; and
wherein the first support and moveable finger are configured to be aligned in the gap in an envelope receiving position, the moveable finger is configured to move to an envelope separating position at a rotation rate in degrees/second which is equal to or greater than a rotation rate of the envelope feeder in degrees/second.

7. The envelope separator of claim 1 wherein the support defines two spaced sections with a gap therebetween and wherein at least one of the two spaced sections comprises two spaced tips and at least part of the envelope feeder is positioned between the two spaced tips.

8. An envelope separator comprising:
an envelope feeder;
a support adjacent the envelope feeder which is arranged to support envelopes received from said envelope feeder moving in a feed direction;
a first support moveable with respect to said support and at least two fingers comprising a first and a second finger connected to said first support and extending from either side of the first support, the first and second fingers configured to be positioned such that a plurality of the envelopes are between said first and second fingers;
at least one of the first and second fingers is a moveable finger moveable with respect to the first support;
the support comprises a moveable support and a surface, the moveable support configured to move relative to the surface away from the envelope feeder as envelopes are positioned on the surface such that the moveable support holds envelopes upright on the surface, and the moveable support is biased towards the envelope feeder with a spring.

9. The envelope separator of claim 8 wherein the support further comprises at least one support finger which is moveable, and wherein the support finger is configured to press against one or more of the plurality of envelopes and when a group of the plurality of envelopes are held between the first and second fingers and removed from the support, the at least one support finger is configured to press against a first envelope in a next group of the plurality of envelopes to hold the first envelope in an upright position at least until the moveable support moves towards the envelope feeder to hold the first envelope in the upright position.

10. An envelope separator comprising:
an envelope feeder;
a support adjacent the envelope feeder which is arranged to support envelopes received from said envelope feeder moving in a feed direction;

a first support moveable with respect to said support and at least two fingers comprising a first and a second finger connected to said first support and extending from either side of the first support, the first and second fingers configured to be moved from below the support to be positioned such that a plurality of the envelopes are pressed between said first and second fingers;

at least one of the first and second fingers is a moveable finger moveable with respect to the first support;

at least one support finger mounted to the support and configured to press against envelopes received from the envelope feeder to maintain an upright orientation of the envelopes, the at least one support finger configured to move in the feed direction.

11. The envelope separator according to claim 10 further comprising:

the first support tiltable with respect to said suppor to modify a tilt angle of the first suppoer relative to the support.

12. The envelope separator of claim 11 wherein the envelopes are fed upside down such that the upper corner is in a downward position.

13. The envelope separator of claim 10 wherein the at least one support finger moves in the feed direction by rotating.

14. An envelope separator configured to collect envelopes from an envelope feeder comprising:

a support adjacent the envelope feeder and including a surface and a moveable support, the surface configured to support envelopes received from the envelope feeder moving in a feed direction and the moveable support configured to hold the envelopes upright and to move away from the envelope feeder as envelopes are fed onto the surface;

a first support moveable with respect to said support and at least two fingers comprising a first and a second finger connected to said first support and extending from either side of the first support, the first support configured to align with the first finger between two envelopes with a group of envelopes between the first and second fingers, at least a portion of the first and second fingers are inclined with respect to the first support;

at least one of the first and second fingers is a moveable finger moveable with respect to the first support;

wherein the moveable finger is positioned closer to the envelope feeder than the first finger, the support comprising two spaced sections each having an inclined section and the moveable finger is moveable from a position aligned with the inclined sections to a position extending across the feed direction to separate a plurality of envelopes from other envelopes being fed out of the envelope feeder.

15. The envelope separator of claim 14 wherein the envelope feeder is configured to rotate to feed the envelopes; and wherein the first support is attached to a robotic arm.

16. The envelope separator of claim 14 further comprising:

the first support is attached to a robotic arm; and the robotic arm is configured to modify a tilt angle of the first support relative to the support to place the first finger between the two envelopes and move the first support such that the second finger is positioned at an opposite side of the group of envelopes and the moveable finger is configured to move to exert pressure on the group of envelopes to hold the group of envelopes.

17. The envelope separator of claim 16 wherein an end of the at least one finger is configured to move away from the envelope feeder.

18. The envelope separator of claim 14 further comprising at least one support finger mounted to the support and configured to press against envelopes received from the envelope feeder to maintain an upright orientation of the envelopes, the at least one support finger configured to move in the feed direction wherein the at least one side support moves in the feed direction by rotating.

* * * * *